(12) United States Patent
Muratsu et al.

(10) Patent No.: US 11,824,226 B2
(45) Date of Patent: Nov. 21, 2023

(54) BATTERY MODULE

(71) Applicant: Panasonic Intellectual Property Management Co., Ltd., Osaka (JP)

(72) Inventors: Jiro Muratsu, Osaka (JP); Hirotaka Ogino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 376 days.

(21) Appl. No.: 17/267,527

(22) PCT Filed: Feb. 13, 2019

(86) PCT No.: PCT/JP2019/005068
§ 371 (c)(1),
(2) Date: Feb. 10, 2021

(87) PCT Pub. No.: WO2020/066055
PCT Pub. Date: Apr. 2, 2020

(65) Prior Publication Data
US 2021/0234240 A1    Jul. 29, 2021

(30) Foreign Application Priority Data
Sep. 26, 2018   (JP) ................. 2018-180513

(51) Int. Cl.
*H01M 50/509* (2021.01)
*H01M 50/213* (2021.01)
(Continued)

(52) U.S. Cl.
CPC ..... *H01M 50/509* (2021.01); *H01M 10/0422* (2013.01); *H01M 50/213* (2021.01);
(Continued)

(58) Field of Classification Search
CPC .... H01M 50/509; H01M 50/50; H01M 50/55; H01M 50/213; H01M 50/583; H01M 10/0422
See application file for complete search history.

(56) References Cited

U.S. PATENT DOCUMENTS

2011/0177365 A1   7/2011   Yasui et al.
2014/0234668 A1   8/2014   Sweney et al.
(Continued)

FOREIGN PATENT DOCUMENTS

CN    102272980 A    12/2011
CN    104078636 A    10/2014
(Continued)

OTHER PUBLICATIONS

International Search Report of PCT application No. PCT/JP2019/005068 dated May 21, 2019.
(Continued)

*Primary Examiner* — Jane J Rhee
(74) *Attorney, Agent, or Firm* — McDermott Will & Emery LLP

(57) ABSTRACT

In a battery module, a plurality of unit batteries in which positive electrode terminals and negative electrode terminals are arranged at one-side ends are arranged in a staggered pattern while the one-side ends are arrayed on the same side, n pieces of battery blocks in which m pieces of the unit batteries adjacent to one another are connected in parallel to one another are connected in series to one another, two or more rows in which the unit batteries are arranged in a direction perpendicular to a series current direction are present on one battery block, the number of the unit batteries in each row is less than or equal to (m−1), an electrically insulating plate is arranged above the one-side ends of the plurality of arrayed unit batteries, the plate is provided with holes from which the positive electrode terminals and the
(Continued)

negative electrode terminals of the respective unit batteries are exposed, and is provided with a plurality of conductive members on a surface opposite to a surface facing the unit batteries, and the conductive members extend along the rows in which the unit batteries in the battery blocks are arrayed, two conductive members are arranged with respect to one battery block, and the conductive members are provided with terminal connecting portions connected through the holes to the same-polarity terminals of the respective unit batteries included in one battery block.

8 Claims, 9 Drawing Sheets

(51) Int. Cl.
    *H01M 10/04* (2006.01)
    *H01M 50/55* (2021.01)
    *H01M 50/583* (2021.01)
    *H01M 50/50* (2021.01)

(52) U.S. Cl.
    CPC ........... *H01M 50/50* (2021.01); *H01M 50/55* (2021.01); *H01M 50/583* (2021.01)

(56) References Cited

U.S. PATENT DOCUMENTS

| | | |
|---|---|---|
| 2014/0255748 A1 | 9/2014 | Jan et al. |
| 2014/0295240 A1 | 10/2014 | Takeda et al. |
| 2015/0325824 A1* | 11/2015 | Hasegawa ............. H01M 50/30 429/151 |
| 2016/0181579 A1* | 6/2016 | Geshi .................. H01M 50/581 429/61 |
| 2017/0346139 A1 | 11/2017 | Kobayashi et al. |

FOREIGN PATENT DOCUMENTS

| | | |
|---|---|---|
| CN | 104995758 A | 10/2015 |
| CN | 107425161 A | 12/2017 |
| JP | 2016-514345 | 5/2016 |
| JP | 2016-516273 | 6/2016 |
| WO | 2011/007535 | 1/2011 |
| WO | 2014/130260 | 8/2014 |
| WO | 2014/164560 | 10/2014 |

OTHER PUBLICATIONS

English Translation of Chinese Office Action dated Jul. 29, 2022 for the related Chinese Patent Application No. 201980058763.2.

* cited by examiner

BATTERY MODULE

CROSS-REFERENCE TO RELATED APPLICATIONS

This application is a U.S. national stage application of the PCT International Application No. PCT/JP2019/005068 filed on Feb. 13, 2019, which claims the benefit of foreign priority of Japanese patent application No. 2018-180513 filed on Sep. 26, 2018, the contents all of which are incorporated herein by reference.

TECHNICAL FIELD

The present invention relates to a battery module including a plurality of unit batteries.

BACKGROUND ART

In recent years, from a viewpoint of resource saving and energy saving, demand for repeatedly usable secondary batteries such as nickel-hydrogen batteries, nickel-cadmium batteries, and lithium-ion batteries has increased. Among them, the lithium-ion secondary batteries have a feature that the battery is light in weight but has a high electromotive force and a high energy density. Therefore, there is an increasing demand as power sources for driving a variety of portable electronic instruments and mobile communication instruments such as portable telephones, digital cameras, video cameras, and notebook personal computers.

Meanwhile, in order to reduce usage of fossil fuel and to reduce an emission amount of $CO_2$, battery modules are increasingly expected as power sources for driving motors of vehicle or the like or power sources for home use or industrial use. As an example of such a battery module as described above, a battery module can be mentioned, which is, in order to obtain desired voltage and capacity, composed of a plurality of unit batteries and configured by mounting a plurality of assembled batteries, each of which has the unit batteries connected in parallel to one another and in series to one another. PTL 1 discloses such a battery module (battery pack), including a plurality of battery cells. The plurality of battery cells have first terminals of the battery cells at first ends of the plurality of battery cells and have portions of a plurality of second terminals of the plurality of battery cells at the first ends of the plurality of battery cells. The first ends of the plurality of battery cells are arranged on the same plane. The battery module includes a plurality of bus bars which are provided near the first ends of the plurality of battery cells and are coupled to the first terminals and the portions of the second terminals of the plurality of battery cells such that the plurality of battery cells are arranged in one of the following connection states: series connection; parallel connection; and series connection and parallel connection.

CITATION LIST

Patent Literature

PTL 1: Japanese Translation of PCT Publication No. 2016-516273

SUMMARY OF THE INVENTION

However, in the battery module disclosed in PTL 1, connections between the terminals of the battery cells and the bus bars are made by wire bonding, and a time taken for connection work in a connection step is lengthened, and cost is accordingly increased. In addition, these bonding portions have the highest current densities and therefore function as fuses. However, since it is difficult to entirely uniform lengths and thicknesses of the bonding wires in the battery module, characteristics of the fuses cannot be stable. The battery module disclosed in PTL 1 has had such a problem as described above.

The present disclosure has been made in view of such a point, and it is an object of the present disclosure to provide a battery module in which the connection work between the cells can be performed at low cost and it is also possible to increase a degree of freedom in arranging the cells.

A battery module of the present disclosure is a battery module including a plurality of unit batteries, the battery module having a configuration in which positive electrode terminals and negative electrode terminals are arranged at one-side ends of the unit batteries, the plurality of unit batteries are arranged in the closest packing state and so that the one-side ends are arrayed on the same side, n (n is a natural number) pieces of battery blocks in which m (m is a natural number) pieces of the unit batteries adjacent to one another are electrically connected in parallel to one another are connected in series to one another, two or more rows in which the unit batteries are arrayed in a direction perpendicular to a direction of a series current are present in one of the battery blocks, and a number of the unit batteries in one of the rows is less than or equal to (m−1), an electrically insulating plate is arranged above the one-side ends of the plurality of arrayed unit batteries, the plate is provided with holes from which the positive electrode terminals and the negative electrode terminals of the respective unit batteries are exposed, and is provided with a plurality of conductive members on a surface opposite to a surface facing the unit batteries, and the conductive members extend along the rows in which the unit batteries in the battery blocks are arrayed, two of the conductive members are arranged with respect to one of the battery blocks, and the conductive members are provided with terminal connecting portions connected through the holes to the same-polarity terminals of the respective unit batteries included in the one of the battery blocks.

In the entire battery module, at least one of the rows may have a configuration in which the number of the unit batteries included therein differs from the number of each of the other rows.

The conductive members may be made of a plate-shaped metal material, and the conductive members are preferably made of metal foil.

The terminal connecting portions may be provided with a fuse function brought by setting a cross-sectional area of a current flow path to be less than or equal to a predetermined area.

Three or more of the battery blocks are arrayed, and the conductive members arranged at positions other than ends may be connected to the positive electrode terminals of the plurality of unit batteries in one of the battery blocks and may be connected to the negative electrode terminals of the plurality of unit batteries in others of the battery blocks.

A battery module may have a configuration in which, by dividing the above-mentioned battery module into a plurality of portions and separating the plurality of portions from one another, a plurality of installation regions in which the plurality of unit batteries are installed are provided, and a non-installation region in which the unit batteries are not installed is provided between two of the installation regions, the two being adjacent to each other, and each of the conductive members has a link region that electrically couples two of the installation regions, the two being adjacent to each other with the non-installation region sandwiched between the two.

In the present disclosure, the plurality of conductive members are provided on the surface of the electrically insulating plate, and are connected to the same-polarity terminals of the respective unit batteries in the battery blocks through the holes provided in the electrically insulating plate. Accordingly, the battery module has a simple structure, and can easily connect the same poles of the plurality of unit batteries to one another. Moreover, the degree of freedom in arranging the unit batteries is increased.

DESCRIPTION OF EMBODIMENTS

Figure 1:
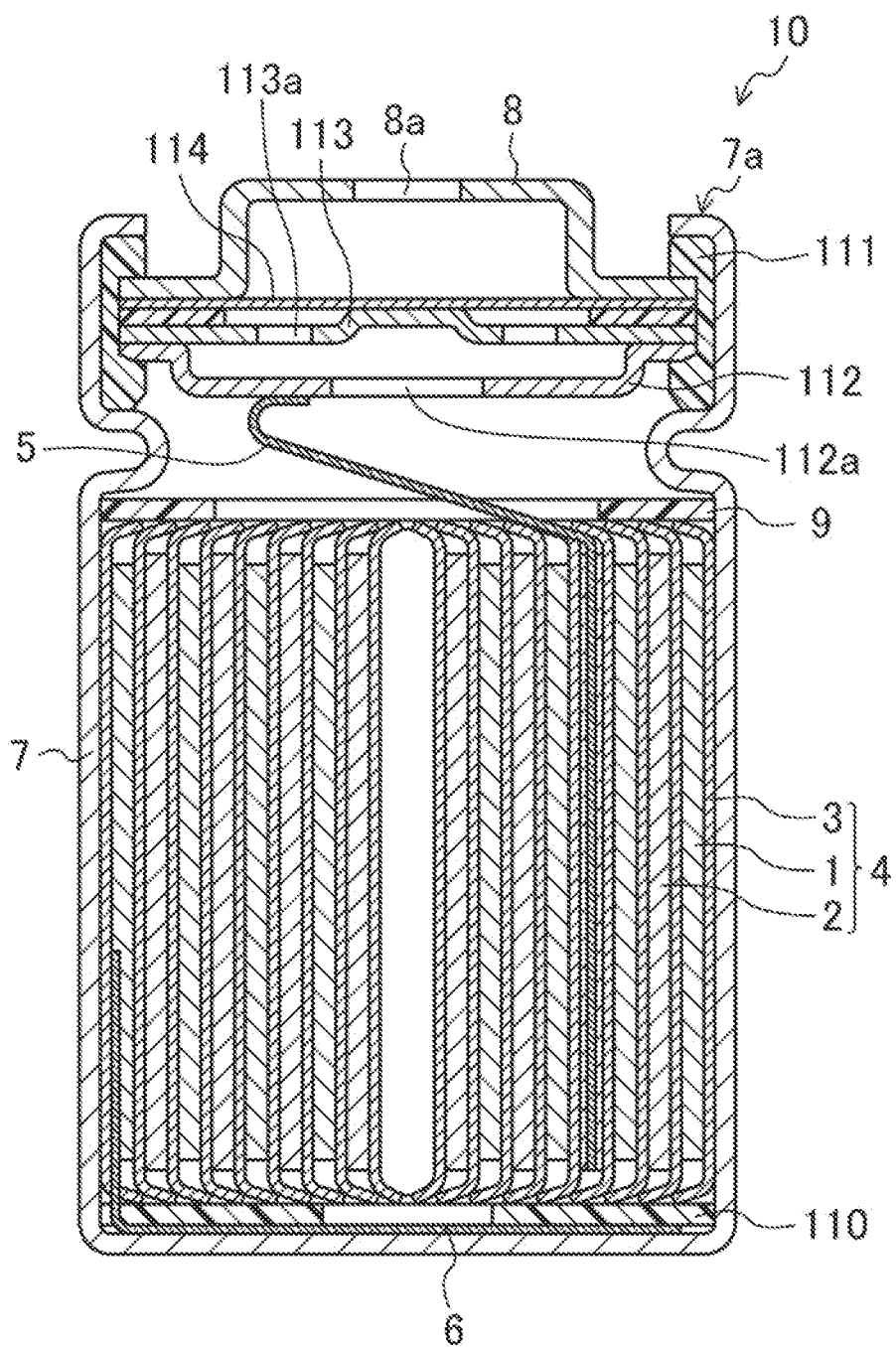
FIG. 1 is a schematic cross-sectional view of a unit battery.

Exemplary embodiments of the present disclosure will be described in detail below with reference to the drawings. The following description of preferred embodiments is essentially merely illustrative, and is not intended to limit the present disclosure, applications thereof or use thereof. In the following drawings, for the sake of simplification, constituent elements having substantially the same functions are denoted by the same reference numerals.

First Exemplary Embodiment

<Unit Battery>

FIG. 1 is a cross-sectional view schematically illustrating a configuration of unit battery 10 for use in a battery module according to a first exemplary embodiment of the present disclosure. Note that a battery for use in the battery module of the present disclosure may be a battery usable alone as a power source for a portable electronic instrument such as a notebook computer (hereinafter, the battery for use in the battery module will be referred to as a "unit battery"). In this case, since a high-performance general-purpose battery can be used as the unit battery of the battery module, performance improvement and cost reduction of the battery module can be achieved more easily.

As unit battery 10 for use in the battery module of the present disclosure, for example, such a cylindrical lithium ion secondary battery as illustrated in FIG. 1 can be adopted. This lithium-ion secondary battery has a normal configuration, and is provided with a safety mechanism that releases gas to the outside of the battery when a pressure inside the battery rises due to an occurrence of an internal short circuit or the like. A specific configuration of unit battery 10 will be described below with reference to FIG. 1.

As illustrated in FIG. 1, electrode group 4 in which positive electrode 2 and negative electrode 1 are wound with separator 3 interposed therebetween is housed in battery case 7 together with a non-aqueous electrolytic solution. Insulating plates 9 and 110 are arranged above and below electrode group 4, positive electrode 2 is bonded to filter 112 via positive electrode lead 5, and negative electrode 1 is bonded via negative electrode lead 6 to a bottom of battery case 7 that also serves as a negative electrode terminal.

Filter 112 is connected to inner cap 113, and a protrusion of inner cap 113 is bonded to metal-made valve plate 114. Moreover, valve plate 114 is connected to a terminal plate that also serves as positive electrode terminal 8. Then, the terminal plate, valve plate 114, inner cap 113, and filter 112 are integrated to seal an opening of battery case 7 with gasket 111 interposed therebetween. Note that battery case 7 is mounted up to an upper end of gasket 111 and presses gasket 111, thereby firmly sealing the opening of battery case 7. An upper end portion (negative electrode terminal 7a) of battery case 7 mounted on the upper end of gasket 111 is located at a position adjacent to the terminal plate (positive electrode terminal 8), and positive electrode terminal 8 and negative electrode terminal 7a are present at one end (upper side in the figure) of a cylinder.

When an internal short circuit or the like occurs in unit battery 10, and the pressure inside unit battery 10 rises, then valve body 114 swells toward the terminal plate, and when the bonding between inner cap 113 and valve body 114 is released, then a current path is blocked. When the pressure in unit battery 10 further rises, valve body 114 breaks. Thus, the gas generated in unit battery 10 is discharged to the outside via through hole 112a of filter 112, through hole 113a of inner cap 113, a crack of valve body 114, and opening portion 8a of the terminal plate.

Note that the safety mechanism that discharges, to the outside, the gas generated in unit battery 10 is not limited to a structure illustrated in FIG. 1, and may have another structure.

<Battery Module as Form for Reference>

Figure 2:
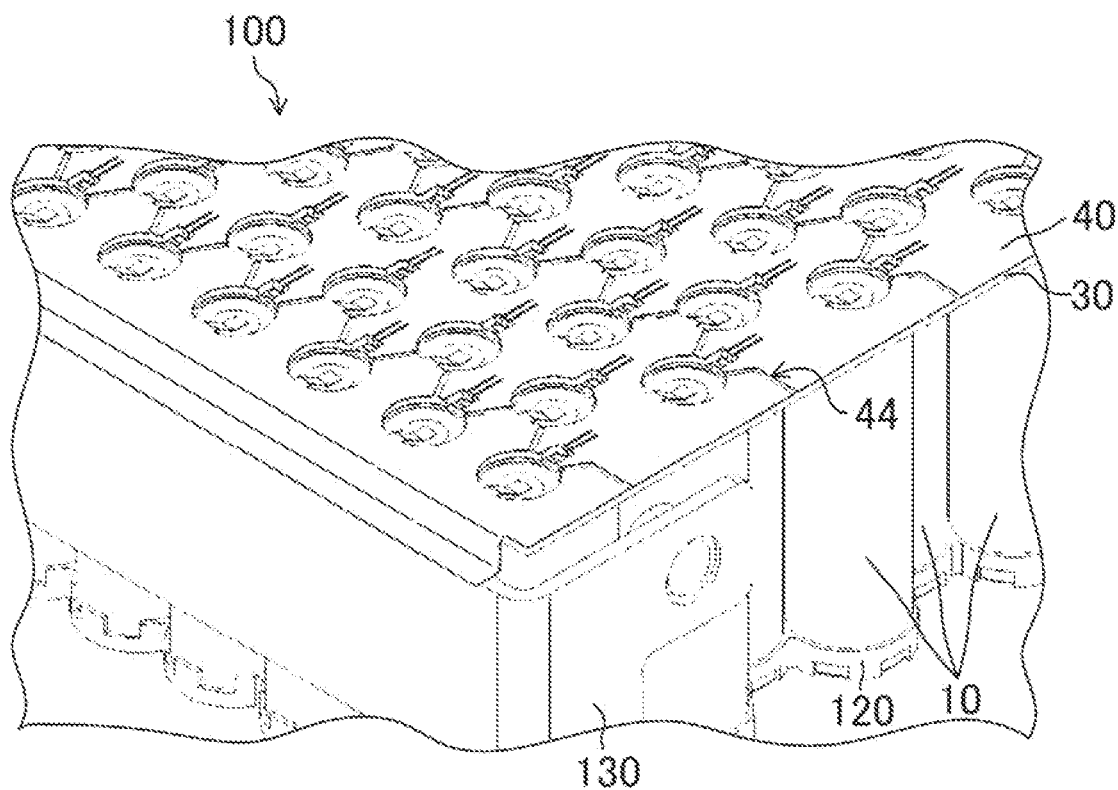
FIG. 2 is an enlarged view of a part of a battery module.
Figure 3:
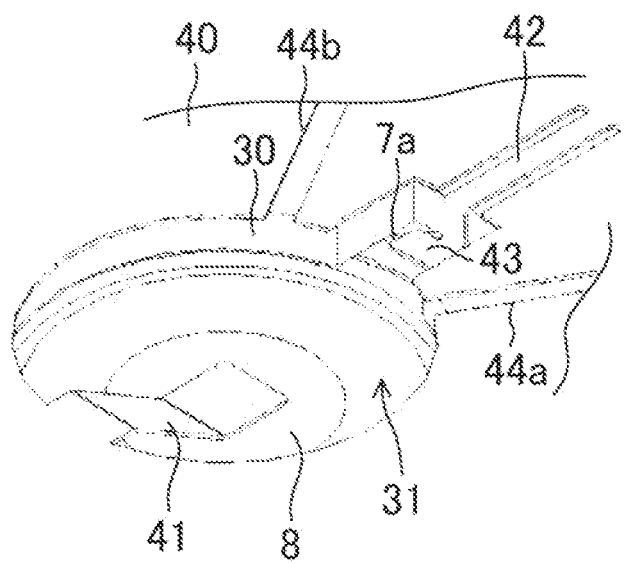
FIG. 3 is an enlarged view of one end side of one cell of a battery module according to an exemplary embodiment.

FIG. 2 is a schematic perspective view of a part of battery module 100, which is enlarged in order to explain a structure of battery module 100 as a form for reference. Note that this figure illustrates an internal structure in which a cover and the like are detached for explanation, and in addition, a shape of conductive member 40 has a different shape from that of a conductive member of the first exemplary embodiment, which will be described below. Arrangement of unit batteries 10, 10, . . . is the same as that in the first exemplary embodiment. FIG. 3 is an enlarged view of a portion of positive electrode terminal 8 and negative electrode terminal 7a of one unit battery 10 in battery module 100.

In battery module 100, the plurality of unit batteries 10, 10, . . . are arranged so that one end of each thereof at which positive electrode terminal 8 and negative electrode terminal 7a are arranged faces upward in FIG. 2. The other end of each of unit batteries 10, 10, . . . is fitted and fixed into battery holder 120. Unit batteries 10, 10, . . . are arranged in a staggered pattern in battery module 100 and are packed most densely under consideration of safety, and accordingly, are arranged next to one another substantially in close proximity. That is, in the illustrated form, unit batteries 10, 10, . . . are arranged at respective vertices and centers of regular hexagons when viewed from above, but the arrangement of unit batteries 10, 10, . . . is not limited to the hexagons, and the arrangement just needs to be in such a staggered pattern. For example, it is conceivable to arrange unit batteries 10, 10, . . . at respective vertices of hexagons formed by flattening the regular hexagons and at centers thereof when viewed from above.

This battery module 100 is formed of unit batteries 10, 10, . . . adjacent to one another, in which a plurality of rows having these unit batteries 10, 10, . . . linearly arrayed therein are arranged side by side in parallel. A positive electrode-side current collecting member and a negative electrode-side current collecting member, which extend in parallel to these rows, are arranged at both side ends of battery module 100, and positive electrode-side external terminal connecting portion 130 and negative electrode-side external terminal connecting portion 140 are provided at ends thereof.

Insulating plate (electrically insulating plate) 30 is disposed above one-side ends of unit batteries 10, 10, . . . . Insulating plate 30 is provided with holes 31 each corresponding to each of unit batteries 10. Holes 31 expose positive electrode terminals 8 and negative electrode terminals 7a of respective unit batteries 10. Conductive members 40 made of a plate-shaped metal material are provided on a surface of insulating plate 30, which is opposite to a surface thereof facing unit batteries 10. A plurality of conductive members 40 are present on insulating plate 30, and respective conductive members 40 are separated from one another by slits 44, 44a, 44b and are electrically independent of one another.

Examples of a material of insulating plate 30 can include a thin plate obtained by hardening glass fiber with epoxy resin and a plate made of resin such as acrylic (PMMA) and polycarbonate (PC). Examples of the material of conductive members 40 can include aluminum, copper and the like.

In conductive members 40, most of portions thereof which face holes 31 are removed to be perforated similarly to holes 31. However, each of positive electrode terminal connecting portions 41 connected to positive electrode terminals 8 and each of negative electrode terminal connecting portions 43 connected to negative electrode terminals 7a have a shape protruding into the hole of each of conductive members 40. Moreover, at edge portions of holes 31 of insulating plate 30, conductive members 40 have a shape of slightly overhanging holes 31. Such an overhang shape as described above is adopted, whereby an area of conductive members 40 can be increased. Thus, an amount of current flowing through one conductive member 40 can be increased. Moreover, a surface area of conductive members 40 can be increased, whereby an amount of heat radiation can be increased.

Moreover, in each of negative electrode terminal connecting portions 43, coupling portion 42 connected to a main body portion of each of conductive members 40 has a narrow strip shape, and a design is made so that a density of a current per unit cross-sectional area, the current passing through this coupling portion 42, becomes the highest in conductive member 40. That is, a cross-sectional area of a flow path of the current flowing through coupling portion 42 is set to be less than or equal to a predetermined area, whereby coupling portion 42 is burnt out when an overcurrent flows therethrough. Accordingly, coupling portion 42 has a function of a fuse.

It is possible to form conductive members 40 by cutting with a laser, etching, or the like. Such a process is performed, whereby variations in the shapes, dimensions, and cross-sectional areas of respective positive electrode terminal connecting portions 41 and negative electrode terminal connecting portions 43 can be reduced. Therefore, an amount of current that burns out each coupling portion 42 of negative electrode terminal connecting portion 43 can be kept constant in any of coupling portions 42 without any variation.

Battery Module of First Exemplary Embodiment

Next, referring to FIGS. 4 to 6, a description will be given of arrangement and electrical connection of unit batteries 10, 10, . . . of battery module 110 according to the first exemplary embodiment, and of a configuration of conductive members for making the electrical connection.

Figure 4:
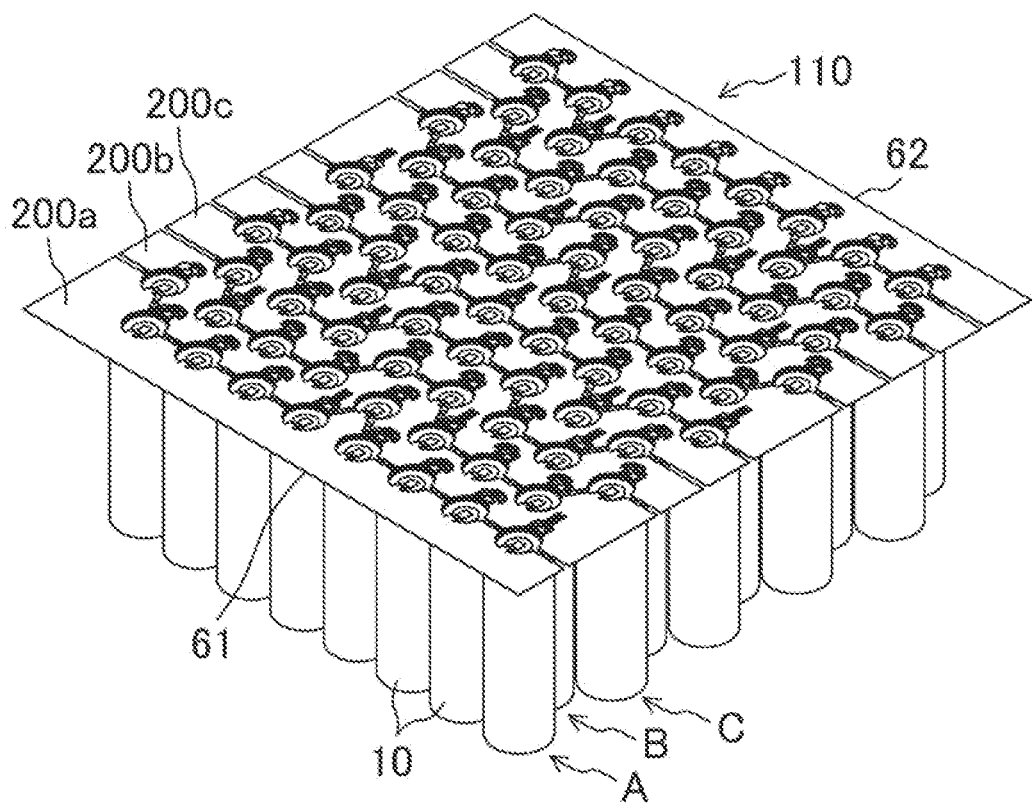
FIG. 4 is a schematic perspective view of a battery module according to a first exemplary embodiment.

FIG. 4 is a perspective view illustrating only unit batteries 10, 10, . . . and a plurality of conductive members 200a, 200b, 200c, . . . for the purpose of making it easy to explain battery module 110 according to the first exemplary embodiment.

In the present exemplary embodiment, ten rows (A, B, C, . . . ) in each of which eight unit batteries 10, 10, . . . are arrayed are arranged, and there are 80 unit batteries 10, 10, . . . .

Figure 5:
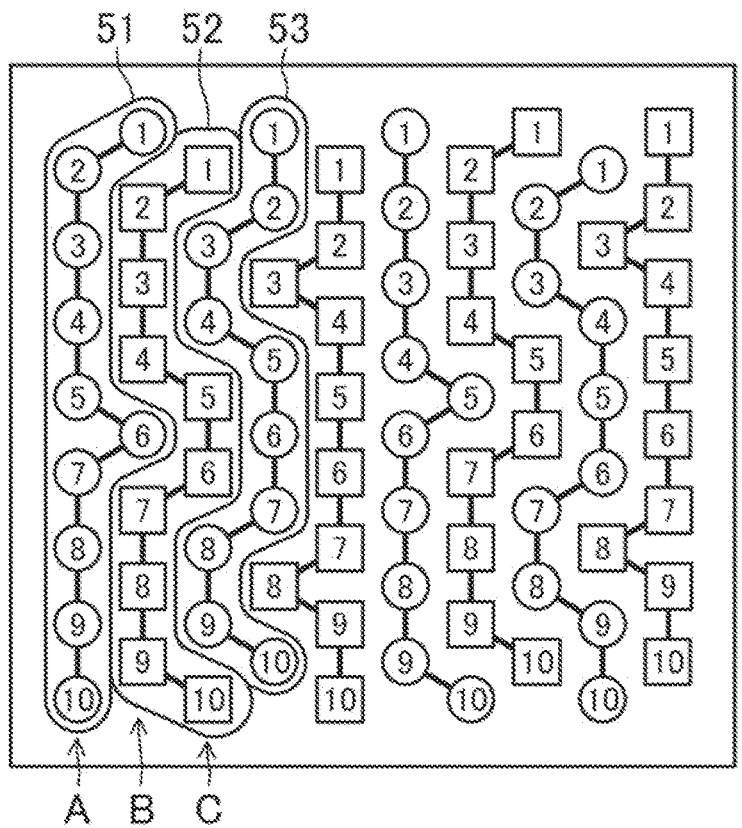
FIG. 5 is a diagram illustrating how the unit batteries are arranged in the battery module according to the first exemplary embodiment.

FIG. 5 is a diagram illustrating an order of the electrical connection of unit batteries 10, 10, . . . based on a planar configuration of FIG. 4. In FIG. 5, circles or rectangles with numbers written inside, which are connected to one another by lines, indicate that the unit batteries represented by the circles or the rectangles are connected in parallel to one another. One aggregate of unit batteries 10, 10, . . . connected in parallel to one another is called battery block 51, 52, 53, . . . . That is, in the present exemplary embodiment, eight battery blocks 51, 52, 53, . . . in each of which ten unit batteries 10, 10, . . . are connected in parallel to one another are present, and the battery blocks adjacent to one another are connected in series to one another. The number of unit batteries 10, 10, . . . included in respective battery block 51, 52, 53, . . . is the same for all the battery blocks. Such parallel and series connections are formed by a structure/configuration of conductive members 200a, 200b, 200c, . . . . Note that a positive electrode of the whole of battery module 110 is composed of the whole of side 61 that goes along row A of leftmost conductive member 200a in FIG. 4, and a negative electrode thereof is composed of the whole of side 62 that goes along row A of a rightmost conductive member.

Figure 6:
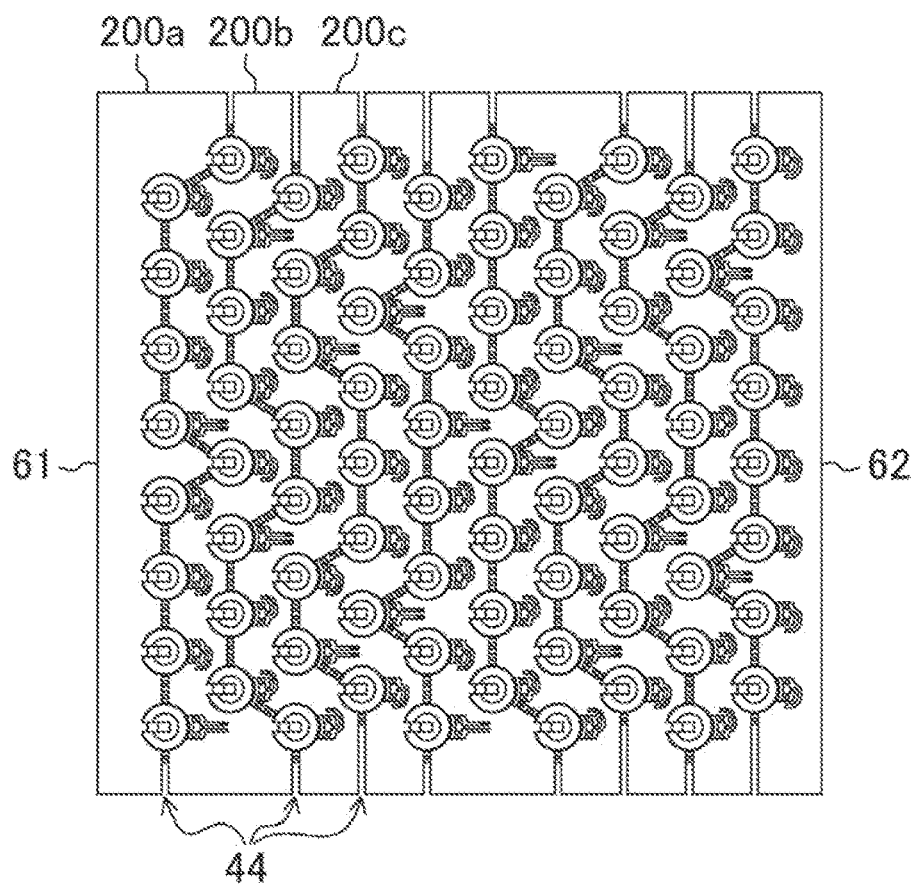
FIG. 6 is a plan view illustrating conductive members according to the first exemplary embodiment.

FIG. 6 is a plan view illustrating only the plurality of conductive members 200a, 200b, 200c, . . . .

In first battery block 51, first unit battery 10 is located in row B, and second unit battery 10 is located in row A, and is present at a position diagonally lower left of and adjacent to first unit battery 10. Third to fifth unit batteries 10, 10, 10 are individually located in row A, and are present at a position below and adjacent to previous unit battery 10. Sixth unit battery 10 is located in row B, and is present at a position diagonally lower right of and adjacent to fifth unit battery 10. Seventh unit battery 10 is located in row A, and is present at a position diagonally lower left of and adjacent to sixth unit battery 10. Eighth to tenth unit batteries 10, 10, 10 are individually located in row A, and are present at a position below and adjacent to previous unit battery 10.

Hence, in first battery block 51, eight unit batteries 10, 10, . . . are located in row A, and two unit batteries 10, 10 are located in row B.

In second battery block 52, first unit battery 10 is located in row C, and second battery 10 is located in row B, and is present at a position diagonally lower left of and adjacent to first unit battery 10. Third and fourth unit batteries 10, 10 are individually located in row B, and are present at a position below and adjacent to previous unit battery 10. Fifth unit battery 10 is located in row C, and is present at a position diagonally lower right of and adjacent to fourth unit battery 10. Sixth unit battery 10 is located in row C, and is present at a position below and adjacent to fifth unit battery 10. Seventh unit battery 10 is located in row B, and is present at a position diagonally lower left of and adjacent to sixth unit battery 10. Eighth and ninth unit batteries 10, 10 are individually located in row B, and are present at a position below and adjacent to previous unit battery 10. Tenth unit battery 10 is located in row C, and is present at a position diagonally lower right of and adjacent to ninth unit battery 10.

Hence, in second battery block 52, six unit batteries 10, 10, . . . are located in row B, and four unit batteries 10, 10 are located in row C.

As described above, in each of eight battery blocks 51, 52, 53, . . . included in battery module 110 of the present exemplary embodiment, unit batteries 10 are arranged in two rows, and the number of unit batteries 10 arranged in one row in each battery block is less than or equal to nine.

Then, in first battery block 51, positive electrode terminals of all unit batteries 10, 10, . . . are connected to one another by conductive member 200a at a left end, and negative electrode terminals of all unit batteries 10, 10, . . . are connected to one another by conductive member 200b next thereto. This conductive member 200b connects the positive electrode terminals of all unit batteries 10, 10, . . . of second battery block 52 to one another, and connects first battery block 51 and second battery block 52 in series to each other. Likewise, in second battery block 52, negative electrode terminals of all unit batteries 10, 10, . . . are connected to one another by third conductive member 200c. This conductive member 200c connects positive electrode terminals of all unit batteries 10, 10, . . . of third battery block 53 to one another, and connects second battery block 52 and third battery block 53 in series to each other.

Note that, among the plurality of conductive members, the conductive members arranged at both ends are such that the conductive member at one end only connects the positive electrode terminals of the one end-side battery block in parallel to one another, and the conductive member at the other end only connects the negative electrode terminals of the other end-side battery block in parallel to one another.

Moreover, for each of battery blocks 51, 52, 53, . . . , there are arranged two conductive members, which are: the conductive member that connects all the positive electrode terminals of unit batteries 10, 10, . . . included therein to one another; and another conductive member that connects all the negative electrode terminals of unit batteries 10, 10, . . . included therein to one another.

Hence, battery module 110 illustrated in FIG. 4 has a configuration in which eight battery blocks each of which is composed in such a manner that ten unit batteries 10, 10, . . . are connected in parallel to one another are connected in series to one another. Then, the one-side end and other-side end conductive members arranged at both side ends of the battery module are electrically connected to the positive electrode-side current collecting member and the negative electrode-side current collecting member, which are arranged at both side ends of the battery module, respectively. Therefore, power for ten parallels and eight series of the unit batteries can be output from the positive electrode-side external terminal connecting portion and the negative electrode-side external terminal connecting portion, which are provided at both-side ends of the battery module.

Here, since battery module 110 of the present exemplary embodiment is configured so that a current flows from side 61 to side 62, rows A, B, C, . . . in each of which eight unit batteries 10, 10, . . . are arrayed in a straight line have a configuration in which unit batteries 10, 10, . . . are arrayed in a direction perpendicular to a direction of a series current.

In the present exemplary embodiment, since currents from the respective unit batteries can be collected by a combination of the perforated insulating plate and the conductive members made of metal foil, a simple structure is achieved, and manufacturing cost can be reduced. Moreover, since the conductive members are made of metal foil, the conductive members can be processed accurately and at low cost by etching or the like, and each of parts which have a fuse function and are connected to the respective unit batteries can also suppress a variation of an amount of breaking current to a small value within one battery module.

A larger number of unit batteries than the number of unit batteries which constitute each row of the battery modules can be connected in parallel to one another, and a degree of freedom in designing the battery module can be increased.

Moreover, since the connection to the terminals of the unit batteries and the current collection are performed by a piece of metal foil, a loss of the current collection can be suppressed to a small value. Note that, if 18650 is used as the unit batteries, and Al foil with a thickness of 150 µm is used as the conductive members, then a current of 2 A/cell can be flown when a width of the coupling portions is set to 1 mm, a width of the positive electrode terminal connecting portions is set to 3 mm, and a minimum dimension between the holes of the adjacent conductive members is set to 8 mm.

Furthermore, when the pressure inside each of the unit batteries rises and the gas generated in the unit battery is discharged to the outside of the unit battery, the gas breaks such metal foil and is easily discharged since a discharge port thereof is only blocked by the conductive member that is the metal foil, and thus the pressure inside the unit battery does not rise too much.

The positive electrode terminal connecting portions and the negative electrode terminal connecting portions can be designed relatively freely in terms of formation positions, shapes and the like, and accordingly, can be designed so as not to easily cause an internal short circuit, and can enhance safety.

Since the positive electrode terminal connecting portions and the negative electrode terminal connecting portions are made of the metal foil, the connections between the positive electrode terminal connecting portions and the positive electrode terminals and between the negative electrode terminal connecting portions and the negative electrode terminals can be performed surely and relatively easily by welding and the like, and the manufacturing cost can be reduced.

Second Exemplary Embodiment

A second exemplary embodiment is different from the first exemplary embodiment in terms of the arrangement of the unit batteries, and is different in terms of the outer shape of the battery module, and further, uses conductive members having shapes different from those of the first exemplary embodiment. However, the unit batteries themselves and portions other than the above-described differences are almost the same as those of the first exemplary embodiment. Accordingly, the portions different from those of the first exemplary embodiment will be described below.

Figure 7:
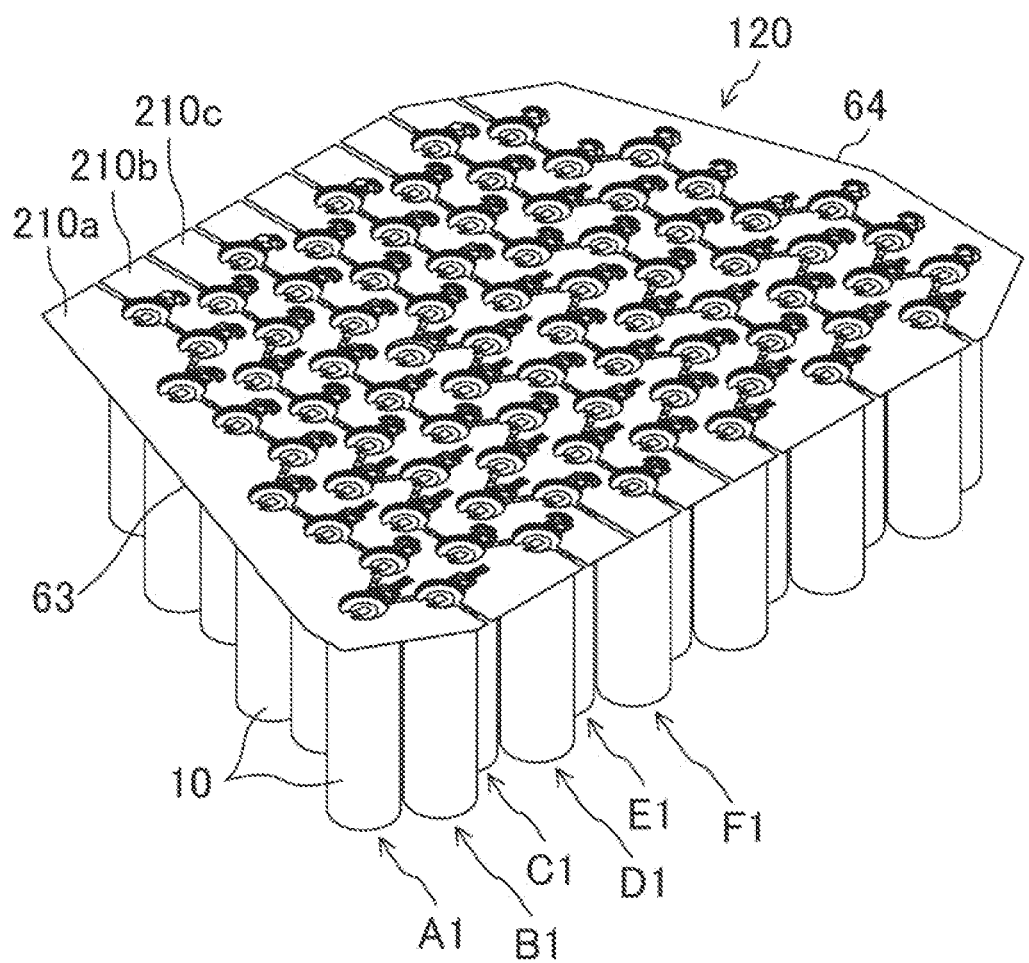
FIG. 7 is a schematic perspective view of a battery module according to a second exemplary embodiment.
Figure 8:
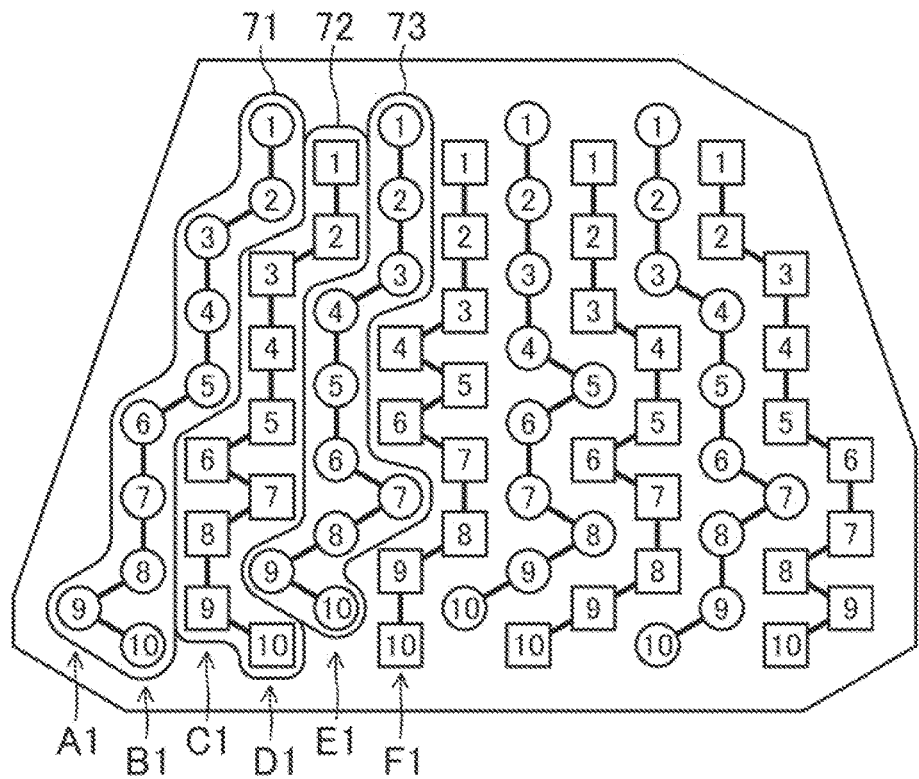
FIG. 8 is a diagram illustrating how unit batteries are arranged in the battery module according to the second exemplary embodiment.
Figure 9:
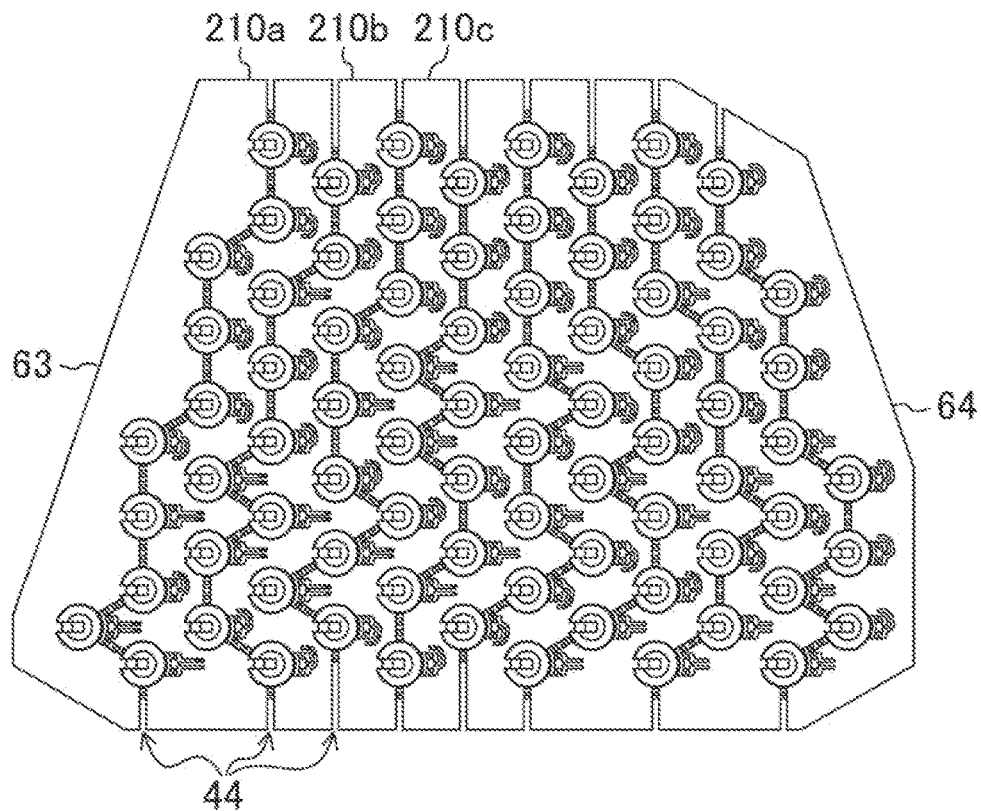
FIG. 9 is a plan view illustrating conductive members according to the second exemplary embodiment.

Referring to FIGS. 7 to 9, a description will be given of arrangement and electrical connection of unit batteries 10, 10, . . . of battery module 120 according to the second exemplary embodiment, and of a configuration of conductive members for making the electrical connection.

FIG. 7 is a perspective view illustrating only unit batteries 10, 10, . . . and a plurality of conductive members 210a, 210b, 210c, . . . for the purpose of making it easy to explain battery module 120 according to the second exemplary embodiment.

In the present exemplary embodiment, the number of unit batteries which constitute rows differs as follows depending on the rows, which are: row A1 having one unit battery 10; row B1 having four unit batteries 10; row C1 having six unit batteries 10; rows D1, F1 each having eight unit batteries 10; and row E1 having seven unit batteries 10. As a whole, arrayed are totally thirteen rows, which are: a row having one unit battery 10; a row having three unit batteries 10; a row having four unit batteries 10; two rows each having six unit batteries 10; four rows each having seven unit batteries 10; and four rows each having eight unit batteries 10. The rows have a total of eighty unit batteries 10, 10, . . . .

FIG. 8 is a diagram illustrating an order of the electrical connection of unit batteries 10, 10, . . . based on a planar configuration of FIG. 7. Those connected to one another by lines in FIG. 8 indicate that the unit batteries are connected in parallel to one another. One aggregate of unit batteries 10, 10, . . . connected in parallel to one another is called battery block 71, 72, 73, . . . . That is, in the present exemplary embodiment, eight battery blocks 71, 72, 73, . . . in each of which ten unit batteries 10, 10, . . . are connected in parallel to one another are present, and the battery blocks adjacent to one another are connected in series to one another. The number of unit batteries 10, 10, . . . included in respective battery block 71, 72, 73, . . . is the same for all the battery blocks. Such parallel and series connections are formed by a structure/configuration of conductive members 210a, 210b, 210c, . . . . Note that a positive electrode of the whole of battery module 120 is composed of the whole of aggregate 63 on the left of leftmost conductive member 210a of FIG. 7, and a negative electrode thereof is composed of the whole of aggregate 64 on the right of a conductive member arranged on the right.

FIG. 9 is a plan view illustrating only the plurality of conductive members 210a, 210b, 210c, . . . .

In first battery block 71, first and second unit batteries 10, 10 are located in row D1, and the second is located below the first. Third unit battery 10 is located in row C1, and is present at a position diagonally lower left of and adjacent to second unit battery 10. Fourth and fifth unit batteries 10, 10 are individually located in row C1, and are present at a position below and adjacent to previous unit battery 10. Sixth unit battery 10 is located in row B1, and is present at a position diagonally lower left of and adjacent to fifth unit battery 10. Seventh and eighth unit batteries 10, 10 are individually located in row B1, and are present at a position below and adjacent to previous unit battery 10.

Ninth unit battery 10 is located in row A1, and is present at a position diagonally lower left of and adjacent to eighth unit battery 10. Tenth unit battery 10 is located in row B1, and is present at a position diagonally lower right of and adjacent to ninth unit battery 10.

Hence, in first battery block 71, one unit battery 10 is located in row A1, four unit batteries 10, 10, . . . are located in row B1, three unit batteries 10, 10, . . . are located in row C1, two unit batteries 10, 10 are located in row D1, and ten unit batteries 10, 10, . . . are arranged in a total of four rows A1, B1, C1, D1.

In second battery block 72, first and second unit batteries 10, 10 are located in row E1, and the second is located below the first. Third unit battery 10 is located in row D1, and is present at a position diagonally lower left of and adjacent to second unit battery 10. Fourth and fifth unit batteries 10, 10 are individually located in row D1, and are present at a position below and adjacent to previous unit battery 10. Sixth unit battery 10 is located in row C1, and is present at a position diagonally lower left of and adjacent to fifth unit battery 10. Seventh unit battery 10 is located in row D1, and is present at a position diagonally lower right of and adjacent to sixth unit battery 10. Eighth unit battery 10 is located in row C1, and is present at a position diagonally lower left of and adjacent to seventh unit battery 10. Ninth unit battery 10 is located in row C1, and is present at a position below and adjacent to eighth unit battery 10. Tenth unit battery 10 is located in row D1, and is present at a position diagonally lower right of and adjacent to ninth unit battery 10.

Hence, in second battery block 72, three unit batteries 10, 10, 10 are located in row C1, five unit batteries 10, 10, . . . are located in row D1, two unit batteries 10, 10 are located in row E1, and ten unit batteries 10, 10, . . . are arranged in a total of three rows C1, D1, E1.

As described above, in each of eight battery blocks 71, 72, 73, . . . included in battery module 120 of the present exemplary embodiment, unit batteries 10 are arranged in a plurality of rows (two rows to four rows), and the number of unit batteries 10 arranged in one row in each battery block is less than or equal to nine.

Then, in first battery block 71, positive electrode terminals of all unit batteries 10, 10, . . . are connected to one another by conductive member 210a at a left end, and negative electrode terminals of all unit batteries 10, 10, . . . are connected to one another by conductive member 210b next thereto. This conductive member 210b connects the positive electrode terminals of all unit batteries 10, 10, . . . of second battery block 72 to one another, and connects first battery block 71 and second battery block 72 in series to each other. Likewise, in second battery block 72, negative electrode terminals of all unit batteries 10, 10, . . . are connected to one another by third conductive member 210c. This conductive member 210c connects positive electrode terminals of all unit batteries 10, 10, . . . of third battery block 73 to one another, and connects second battery block 72 and third battery block 73 in series to each other.

Note that, among the plurality of conductive members, the conductive members arranged at both ends are such that the conductive member at one end only connects the positive electrode terminals of the one end-side battery block in parallel to one another, and the conductive member at the other end only connects the negative electrode terminals of the other end-side battery block in parallel to one another.

Moreover, for each of battery blocks 71, 72, 73, . . . , there are arranged two conductive members, which are: the conductive member that connects all the positive electrode terminals of unit batteries 10, 10, . . . included therein to one another; and another conductive member that connects all the negative electrode terminals of unit batteries 10, 10, . . . included therein to one another.

Hence, battery module 120 illustrated in FIG. 7 has a configuration in which eight battery blocks each of which is composed in such a manner that ten unit batteries 10, 10, . . . are connected in parallel to one another are connected in series to one another.

Here, since battery module 120 of the present exemplary embodiment is configured so that a current flows from aggregate 63 on the left toward aggregate 62 on the right, each of rows B1, C1, D1, E1, . . . has a configuration in which unit batteries 10, 10, . . . are arrayed in a direction perpendicular to a direction of a series current.

The present exemplary embodiment also exerts the same effect as that of the first exemplary embodiment, and has such a high degree of freedom in design that the entire shape of the battery module can be designed to a shape other than a rectangle.

Third Exemplary Embodiment

A third exemplary embodiment is different from the first exemplary embodiment in terms of the arrangement of the unit batteries, and is different in terms of the outer shape of the battery module, and further, uses conductive members having shapes different from those of the first exemplary embodiment. However, the unit batteries themselves and portions other than the above-described differences are almost the same as those of the first exemplary embodiment. Accordingly, the portions different from those of the first exemplary embodiment will be described below.

Figure 10:
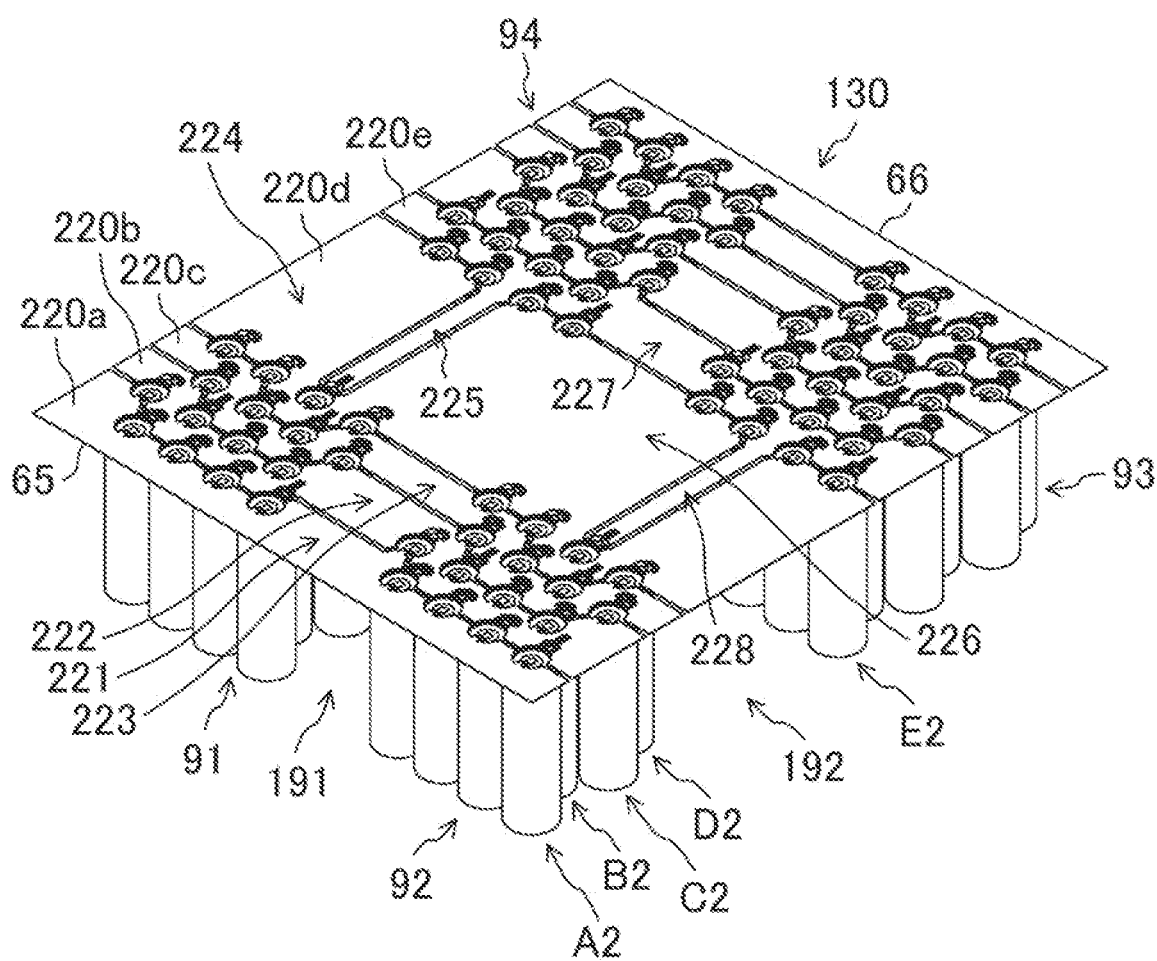
FIG. 10 is a schematic perspective view of a battery module according to a third exemplary embodiment.
Figure 11:
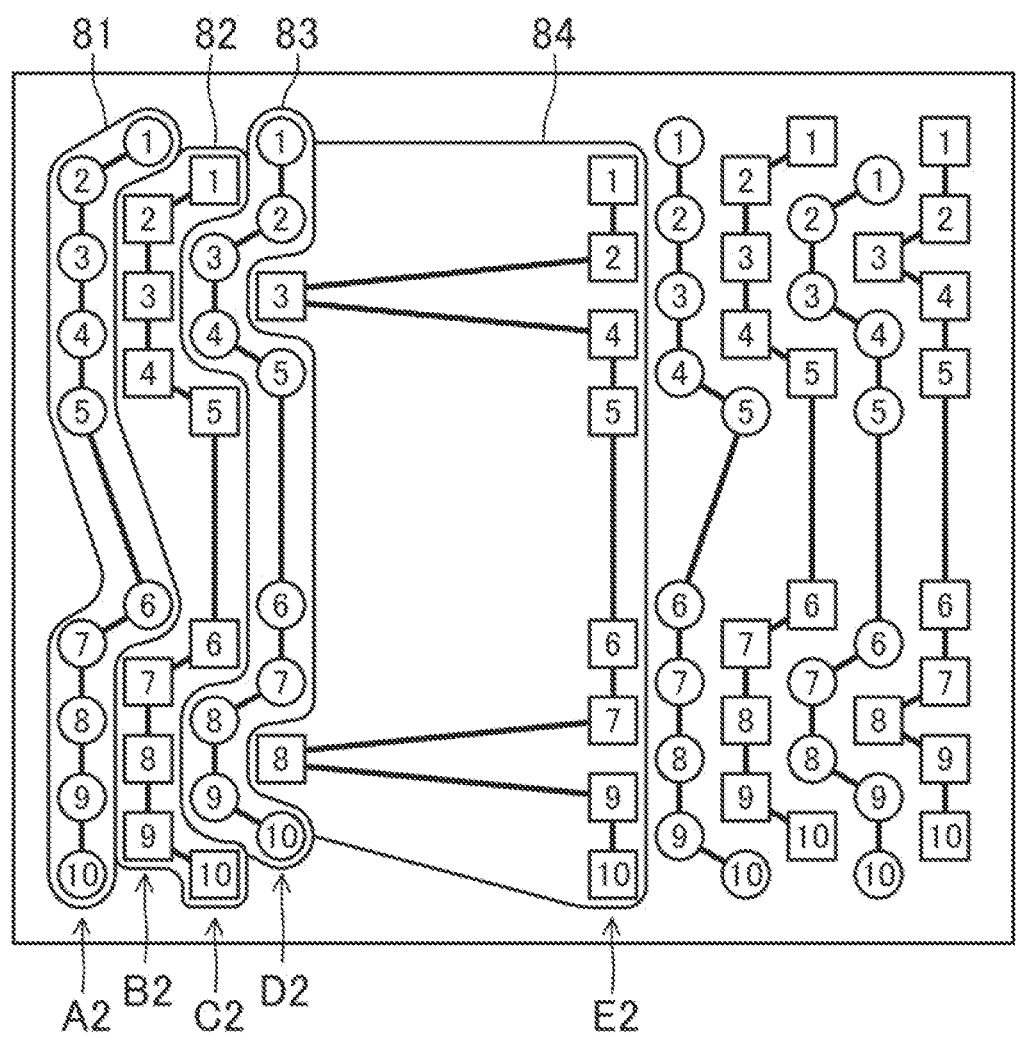
FIG. 11 is a diagram illustrating how unit batteries are arranged in the battery module according to the third exemplary embodiment.
Figure 12:
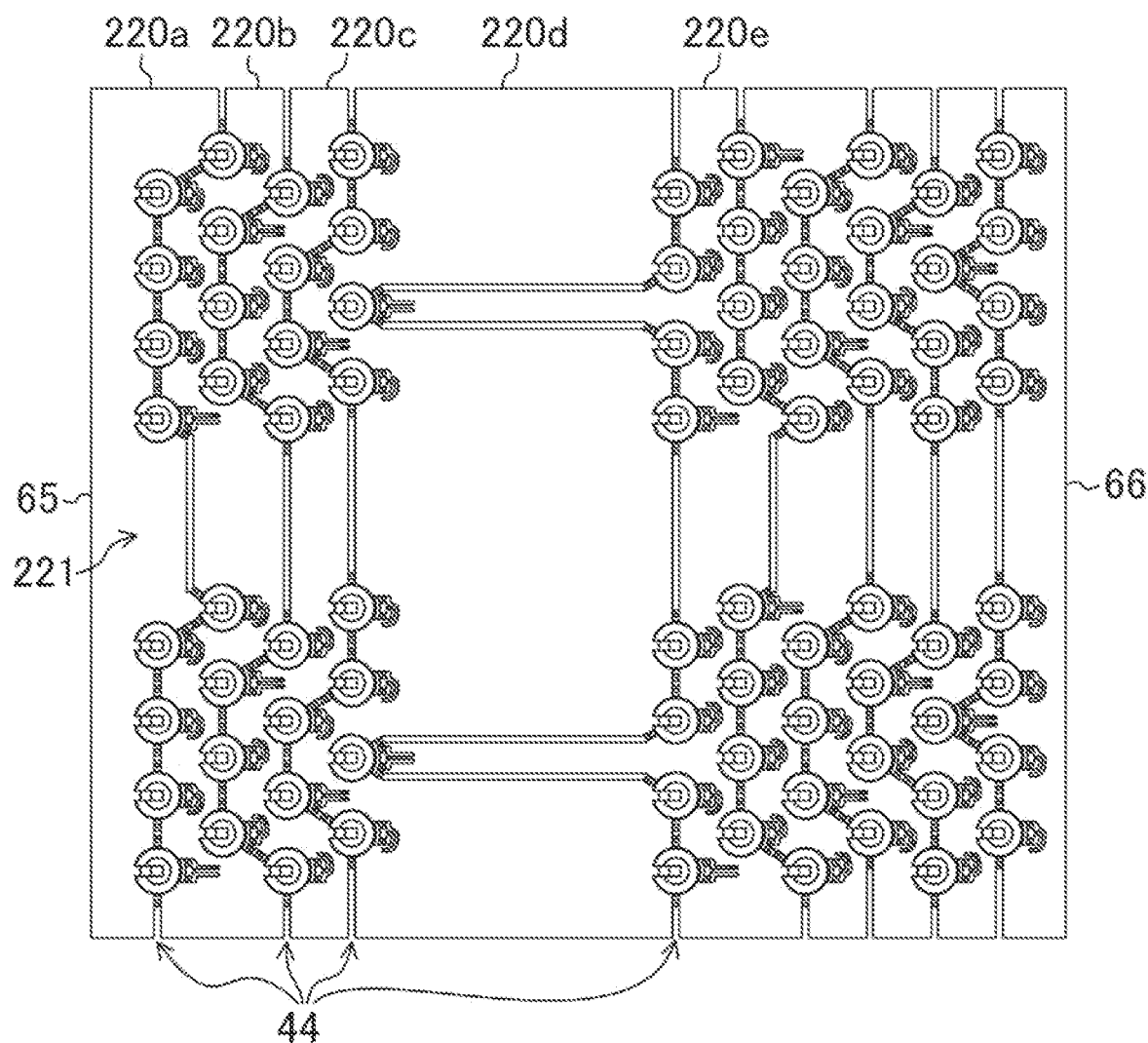
FIG. 12 is a plan view illustrating conductive members according to the third exemplary embodiment.

Referring to FIGS. 10 to 12, a description will be given of arrangement and electrical connection of unit batteries 10, 10, . . . of battery module 130 according to the third exemplary embodiment, and of a configuration of conductive members for making the electrical connection.

FIG. 10 is a perspective view illustrating only unit batteries 10, 10, . . . and a plurality of conductive members 220a, 220b, 220c, . . . for the purpose of making it easy to explain battery module 130 according to the third exemplary embodiment.

FIG. 11 is a diagram illustrating an order of the electrical connection of unit batteries 10, 10, . . . based on a planar configuration of FIG. 10. Those connected to one another by lines in FIG. 11 indicate that the unit batteries are connected in parallel to one another. One aggregate of unit batteries 10, 10, . . . connected in parallel to one another is called battery block 81, 82, 83, 84, . . . . In the present exemplary embodiment, as in the first exemplary embodiment, eight battery blocks 81, 82, . . . are present, and ten unit batteries 10, 10, . . . are included in each of the battery blocks.

FIG. 12 is a plan view illustrating only the plurality of conductive members 220a, 220b, 220c, 220d, 220e, . . . .

In the present exemplary embodiment, based on the arrangement of unit batteries 10, 10, . . . in the first exemplary embodiment, fifth and sixth unit batteries 10 are separated from each other in each of battery blocks 81, 82, . . . , and row D2 and row E2 are separated from each other, whereby four installation regions 91, 92, . . . are formed. Sixteen unit batteries 10, 10, . . . are installed in each of two installation regions 91, 92 on the left, and twenty-four unit batteries 10, 10, . . . are installed in each of two installation regions 93, 94 on the left. Between installation regions 91, 92, . . . adjacent to one another, non-installation regions 191, 192 where no unit batteries 10, 10, . . . are installed are provided. That is, in battery module 130 according to the third exemplary embodiment, the aggregate of unit batteries 10, 10, . . . of battery module 110 according to the first exemplary embodiment is divided into four portions, and the portions are separated from one another; however, the arrangement of unit batteries 10 and the electrical connection between unit batteries 10 are the same as those in the first exemplary embodiment. Note that non-installation regions 191, 192 are provided, for example, to avoid an obstacle that hinders the installation of unit batteries 10, or are provided depending on a shape of an installation spot of battery module 130 when battery module 130 is installed in a vehicle.

In other words, while eighty unit batteries 10, 10, . . . are assembled in a rectangular shape in a staggered arrangement in battery module 110 according to the first exemplary embodiment, battery module 130 according to the third exemplary embodiment has four installation regions 91, 92, . . . in which sixteen and twenty-four unit batteries 10, 10, . . . are individually assembled in a rectangular shape in a staggered arrangement, and has, between installation regions 91, 92, . . . , non-installation regions 191, 192 as spaces where no unit batteries 10 are arranged. When installation regions 91, 92, . . . adjacent to one another are coupled to one another by removing non-installation regions 191, 192, battery module 130 according to the third exemplary embodiment becomes the same as battery module 110 according to the first exemplary embodiment. In conductive members 220a, 220b, 220c, . . . , portions arranged on non-installation regions 191, 192 in conductive members 200a, 200b, 200c, . . . of the first exemplary embodiment have shapes stretched as they are. The portions arranged on the non-installation regions 191, 192 are link regions 221, 222, 223, 224, 225, 226, 227, 228, . . . , and are portions which electrically couple installation regions 91, 92, . . . , which are adjacent to one another, to one another with non-installation regions 191, 192 sandwiched therebetween.

Next, the arrangement of unit batteries 10, 10, . . . in battery blocks 83, 84 will be described.

In third battery block 83, first to fifth unit batteries 10, 10, . . . are installed in installation region 91, and sixth to tenth unit batteries 10, 10, . . . are installed in installation region 92. Among them, first and second unit batteries 10, 10 are located in row D2, and the second is located below the first. Third unit battery 10 is located in row C2, and is present at a position diagonally lower left of and adjacent to second unit battery 10. Fourth unit battery 10 is located in row C2, and is present at a position below and adjacent to third unit battery 10. Fifth unit battery 10 is located in row D2, and is present at a position diagonally lower right of and adjacent to fourth unit battery 10. Sixth unit battery 10 is located in row D2, and is present at a position below fifth unit battery 10 and adjacent thereto with non-installation region 191 sandwiched therebetween. Seventh unit battery 10 is located in row D2, and is present at a position below and adjacent to sixth unit battery 10. Eighth unit battery 10 is located in row C2, and is present at a position diagonally lower left of and adjacent to seventh unit battery 10. Ninth unit battery 10 is located in row C2, and is present at a position below and adjacent to eighth unit battery 10. Tenth unit battery 10 is located in row D2, and is present at a position diagonally lower right of and adjacent to ninth unit battery 10.

In fourth battery block 84, first, second, fourth and fifth unit batteries 10 are installed in installation region 94, third unit battery 10 is installed in installation region 91, sixth, seventh, ninth and tenth unit batteries 10 are installed in installation region 93, and eighth unit battery 10 is installed in installation region 92. Among them, first and second unit batteries 10, 10 are located in row E2, and the second is located below the first. Third unit battery 10 is located in row D2, and is present at a position diagonally lower left of second unit battery 10 and adjacent thereto with non-installation region 192 sandwiched therebetween. Fourth unit battery 10 is located in row E2, and is present at a position diagonally lower right of third unit battery 10 and adjacent thereto with non-installation region 192 sandwiched therebetween. Fifth unit battery 10 is located in row E2, and is present at a position below and adjacent to fourth unit battery 10. Sixth unit battery 10 is located in row E2, and is present at a position below fifth unit battery 10 and adjacent thereto with non-installation region 191 sandwiched therebetween. Seventh unit battery 10 is located in row E2, and is present at a position below and adjacent to sixth unit battery 10. Eighth unit battery 10 is located in row D2, and is present at a position diagonally lower left of seventh unit battery 10 and adjacent thereto with non-installation region 192 sandwiched therebetween. Ninth unit battery 10 is located in row E2, and is present at a position diagonally lower right of eighth unit battery 10 and adjacent thereto with non-installation region 192 sandwiched therebetween. Tenth unit battery 10 is located in row E2, and is present at a position below and adjacent to ninth unit battery 10.

Here, since battery module 130 of the present exemplary embodiment is configured so that a current flows from side 65 to side 66, rows A2, B2, C2, . . . in each of which unit batteries 10, 10, . . . are arrayed in a straight line have a configuration in which unit batteries 10, 10, . . . are arrayed in a direction perpendicular to a direction of a series current.

Hence, battery module 130 of the present exemplary embodiment has substantially the same arrangement of the unit batteries as that of battery module 110 of the first exemplary embodiment. Therefore, the same effect as that of the first exemplary embodiment is exerted. Moreover, the battery module can be divided at arbitrary positions, and the degree of freedom in design is improved.

Other Exemplary Embodiments

The above-mentioned exemplary embodiments are examples of the disclosure of the present application, and the disclosure of the present application is not limited to these examples, and well-known techniques, conventional techniques, and known techniques may be combined or partially replaced with these examples. The disclosure of the present application also includes modified disclosures which can be easily conceived by those skilled in the art.

The number of unit batteries included in one battery module and one battery block is not particularly limited. Moreover, the shapes of the battery module and the battery block on the plane are not particularly limited, either as long as the unit batteries are arranged in a staggered pattern in the battery module (installation region of the unit batteries).

It is preferable to fix the insulating plate and the conductive members by an adhesive or the like. For example, a method of forming conductive members by laminating metal foil on a perforated insulating plate and processing the metal foil by etching or the like is preferable in terms of manufacturing cost and accuracy.

The shape of the holes in the insulating plate may be any shape as long as the positive electrode terminals and the negative electrode terminals are exposed.

The material and thickness of the conductive members just need to be appropriately set according to design values such as a capacity of the battery module and the setting of a charge/discharge rate. Metal foil may be used, or a metal plate may be used.

The portions which function as fuses may be a terminal connecting portion on the positive electrode. Moreover, in order to reduce the cross-sectional area of the current flow path to less than or equal to a predetermined area for the purpose of exerting the fuse function, the predetermined area just needs to be set in consideration of the number of unit batteries per row, the number of rows which constitute the battery blocks, the material, thickness and area of the conductive members, the setting of the charge/discharge rate of the battery module, and the like since the predetermined area differs depending on the respective battery modules.

The division of the battery module is not limited to such a divided state in the third exemplary embodiment, and the number of divisions may be large or small, and the number of unit batteries included in the divided installation regions may be the same or different. Moreover, though the shape of the non-installation regions is also rectangular in the third exemplary embodiment, the shape is not particularly limited.

REFERENCE MARKS IN THE DRAWINGS

7$a$: negative electrode terminal
8: positive electrode terminal
10: unit battery
30: insulating plate (electrically insulating plate)
31: hole
40: conductive member
91,92,93,94: installation region
100,110,120,130: battery module
191,192: non-installation region
200$a$,200$b$,200$c$: conductive member
210$a$,210$b$,210$c$: conductive member
220$a$,220$b$,220$c$: conductive member
220$d$,220$e$: conductive member
221,222,223,224: link region
225,226,227,228: link region
A,B,C: row
A1,B1,C1,D1,E1,F1: row
A2,B2,C2,D2,E2: row

The invention claimed is:
1. A battery module comprising:
a plurality of unit batteries, wherein:
each of the plurality of unit batteries includes a positive electrode terminal and a negative electrode terminal which are arranged on a one-side end of the unit battery,
the plurality of unit batteries are arranged in a staggered pattern, and the one-side ends are arrayed on a same side,
the plurality of unit batteries comprise n battery blocks electrically connected in series, each of the n battery blocks including m unit batteries electrically connected in parallel, each of m unit batteries being adjacent to one another each other among the plurality of unit batteries, where each of n and m is a natural number, and
the m unit batteries included in each of the n battery blocks are arranged in two or more of rows each perpendicular to a direction of a series current, each of the rows including unit batteries in number of (m−1) or smaller among the plurality of unit batteries; and a plate having electrical insulating properties arranged above the one-side ends of the plurality of unit batteries arrayed, wherein:

the plate includes holes from which the positive electrode terminals and the negative electrode terminals of the plurality of the unit batteries are exposed, the plate includes a plurality of conductive members disposed on a surface of the plate opposite to a surface facing the plurality of unit batteries, each of the conductive members extend along each of the rows, two of the conductive members are arranged with respect to each of the battery blocks, each of the two conductive members includes terminal connecting portions connected, through the holes, to positive electrode terminals or to the negative terminals of corresponding unit batteries included in the battery block, and one of the two conductive members connect adjacent battery blocks in series.

2. The battery module according to claim 1, wherein, in the battery module, at least one of the rows includes a different number of the unit batteries from a number of the others of the rows.

3. The battery module according to claim 1, wherein the conductive members are made of a plate-shaped metal material.

4. The battery module according to claim 1, wherein the conductive members are made of metal foil.

5. The battery module according to claim 1, wherein the terminal connecting portions including a fuse function brought by setting a cross-sectional area of a current flow path to be less than or equal to a predetermined area.

6. The battery module according to claim 1, wherein three or more of the battery blocks are arrayed, and the conductive members arranged at positions other than ends are connected to the positive electrode terminals of the plurality of unit batteries in one of the battery blocks and are connected to the negative electrode terminals of the plurality of unit batteries in others of the battery blocks.

7. A battery module, wherein by dividing the battery module according to claim 1 into a plurality of portions and separating the plurality of portions from one another, a plurality of installation regions in which the plurality of unit batteries are installed are provided, and a non-installation region in which the unit batteries are not installed is provided between two of the installation regions, the two being adjacent to each other, and each of the conductive members has a link region that electrically couples two of the installation regions, the two being adjacent to each other with the non-installation region sandwiched between the two.

8. The battery module according to claim 1, wherein:

the two or more of rows comprise three or more of rows and form a row group including a first row, a second row and a third row arranged in this order along the direction of the series current, in at least one row of the row group, a first battery block of the n battery blocks includes a unit battery belonging to the first row and a unit battery belonging to the second row, a second battery block of the n battery blocks is disposed adjacent to the first battery block and includes a unit battery belonging to the second row and a unit battery belonging to the third row, in the first battery block, a unit battery belonging to the first row coupled in parallel to a unit battery of the second row is disposed closer to a first end or a second end opposite to the first end of the first battery block than the unit battery of the second row, in the second battery block, a unit battery belonging to the second row coupled in parallel to a unit battery of the third row is disposed closer to a first end or a second end opposite to the first end of the second battery block than the unit battery of the third row, and a number of unit batteries of the third row belonging to the second battery block is greater than a number of unit batteries of the second row belonging to the first battery block.

* * * * *